United States Patent [19]

Caputo et al.

[11] 4,227,081

[45] Oct. 7, 1980

[54] METHOD OF EVALUATING THE INTEGRITY OF THE OUTER CARBON LAYER OF TRISO-COATED REACTOR FUEL PARTICLES

[75] Inventors: Anthony J. Caputo, Knoxville; Dante A. Costanzo; Walter J. Lackey, Jr., both of Oak Ridge; Frank L. Layton, Clinton; David P. Stinton, Knoxville, all of Tenn.

[73] Assignee: The United States of America as represented by the United States Department of Energy, Washington, D.C.

[21] Appl. No.: 48,290

[22] Filed: Jun. 13, 1979

[51] Int. Cl.$^2$ .................. G03B 41/16; G03C 15/16; G21C 17/00

[52] U.S. Cl. .................. 250/321; 250/323; 250/475.1; 176/19 LD

[58] Field of Search .............. 250/321, 323, 302, 320, 250/358 R, 475.1; 23/230 C; 73/104; 176/19 LD, 91 SP

[56] References Cited

U.S. PATENT DOCUMENTS

| 2,851,338 | 9/1958 | Johns et al. ........................ 176/19 R |
| 4,172,224 | 10/1979 | Lapinski et al. ..................... 250/321 |

FOREIGN PATENT DOCUMENTS 1199130  7/1970  United Kingdom ............... 176/91 SP

OTHER PUBLICATIONS

Foster et al., "Measurement of Carbon Coating Thickness on Microspheres of Nuclear Fuels," Materials Evaluation, 1-70, pp. 13-16.
Pechin et al., "Inspection of High-Temperature Gas--Cooled Reactor Recycle Fuel," ORNL-S16S, Jun. 1977, p. 25.

*Primary Examiner*—Alfred E. Smith
*Assistant Examiner*—Carolyn E. Fields
*Attorney, Agent, or Firm*—James E. Denny; Stephen D. Hamel; Louis M. Deckelmann

[57] ABSTRACT

This invention relates to a method for determining defective final layers of carbon on triso-coated fuel particles and the like. Samples of the particles are subjected to a high temperature treatment with gaseous chlorine and thereafter radiographed. The chlorine penetrates through any defective carbon layer and reacts with the underlying silicon carbide resulting in the volatilization of the silicon as SiCl$_4$ leaving carbon as a porous layer. This porous carbon layer is easily detected by the radiography.

2 Claims, 2 Drawing Figures

METHOD OF EVALUATING THE INTEGRITY OF THE OUTER CARBON LAYER OF TRISO-COATED REACTOR FUEL PARTICLES

BACKGROUND OF THE INVENTION

This invention relates to a method for determining defective layers of carbon on reactor fuel particles, and more particularly for determining any defective final layers of carbon on triso-coated fuel particles, such as to provide substantially crack-free fuel particles for making fuel rods to thus assure the more efficient operation of such fuel rods in a reactor in which they are to be utilized. The invention described herein is a result of a contract with the U.S. Department of Energy.

Fuel rods for use in a high temperature gas-cooled reactor (HTGR) are right circular cylinders of a carbonized matrix containing fissile, fertile and inert particles to provide a given composition for a particular location in the reactor. The particles are normally small spheres; the fissile particles being carbon-coated microspheres of a uranium oxicarbide, and the fertile particles being carbon-coated microspheres of thorium oxide. The fissile particles are designated as triso-coated particles, which coatings include an inner porous carbon coating, an inner low-temperature isotropic (LTI) carbon coating over the porous layer, a silicon carbide coating over the inner LTI layer, and a final, outer LTI carbon coating.

During the fabrication of such particles, samples are inspected after each step to assure high integrity for each layer in order to determine that undamaged coated particles are utilized in the making of fuel rods. Other tests are conducted relative to size, shape, density, etc.

A conventional test for the integrity of the inner LTI layer involves subjecting the particles to a flowing stream of chlorine gas at 1500° C. If the coating has a flaw, the chlorine reacts with the uranium in the kernel of the particle to produce uranium chloride which is then detected in the outlet gas stream. The degree of porosity of such coating can be detected using gas absorption techniques or by mercury porosimetry.

A different method is utilized to study the integrity of the SiC layer after deposition thereof on the inner LTI layer. The SiC-coated particle is subjected to pressurized mercury and thereafter is radiographed. If a crack exists in the SiC coating, the mercury will be observed within the coating and between the layers of the SiC and the inner LTI coating.

Prior to the present invention, no satisfactory method existed to test the integrity of the outer LTI layer. As above, the degree of porosity can be measured by gas absorption techniques; however, this method does not distinguish between some general surface porosity and a fine crack that extends through the layer to the SiC coating.

It is thus an object of the present invention to provide a method for determining the existence of cracks penetrating the outer layer of an isotropic vapor-deposited carbon coating covering the silicon carbide coating of a triso-coated fuel particle(s).

Other objects, advantages and novel features of the present invention will become apparent to those skilled in the art upon examination of the following detailed description of a preferred embodiment of the invention and the accompanying drawings.

SUMMARY OF THE INVENTION

A method is provided for determining the existence of cracks penetrating a layer of isotropic vapor-deposited carbon coating covering silicon carbide of triso-coated fuel particles, which comprises subjecting the carbon coatings to a substantially pure chlorine gas atmosphere at a temperature of about 1500° C. for a time period of 1-5 hours, and thereafter radiographing the particles, to determine any change in density of the silicon carbide portion as a result of a reaction between the chlorine gas and the silicon carbide to form low density carbon and volatile silicon chloride.

DESCRIPTION OF THE PREFERRED METHOD

Figure 1:
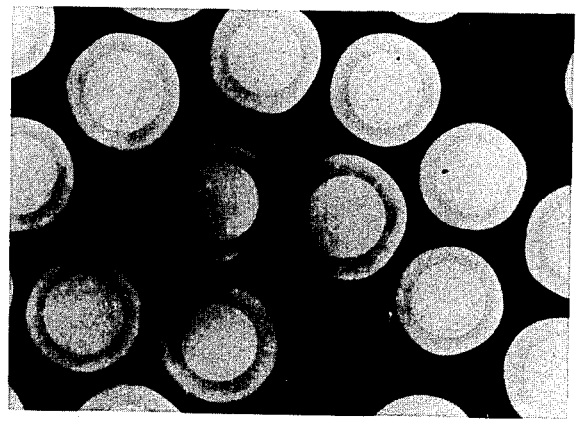
FIG. 1 is a radiograph of a sample of triso-coated particles after being subjected to $Cl_2$ at 1500° C. for 1 hour.

It has been found that chlorine gas, at a temperature of about 1500° C., reacts with silicon carbide to form porous carbon and volatile silicon chloride according to the reaction:

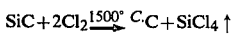

$$SiC + 2Cl_2 \xrightarrow{1500°\,C.} C + SiCl_4 \uparrow$$

Accordingly, when triso-coated fuel particles of the HTGR type are treated with the hot gaseous chlorine, a radiograph of the particle(s) after the $Cl_2$ treatment will show any lowered density region where chlorine penetrates a crack(s) in the outer LTI layer(s). If no crack exists, there is no reaction at the silicon carbide region and therefore no change in the density when viewed radiographically.

The method has been investigated as follows. A sample of particles from a given coating batch was subjected to a flowing stream of hot chlorine at a temperature of about 1500° C. These particular particles had a kernel size of 449.2 $\mu m$; the buffer carbon layer was 53.6 $\mu m$; the inner LTI layer was 28.7 $\mu m$; the SiC layer was 35.5 $\mu m$; and the outer LTI coating was 49.0 $\mu m$. After given periods of time, representative portions of the sample were radiographed using 6 KeV X-rays.

the radiograph of FIG. 1 illustrates several triso-coated particles after treatment with hot chlorine gas for one hour. The doublet particle in the center apparently had a crack extending through the outer LTI coating enabling the chlorine to react with the SiC layer(s) thereby volatilizing $SiCl_4$ and leaving a porous carbon area which is evident in the radiograph. The other particles in the radiograph exhibit no penetration by the chlorine.

Figure 2:
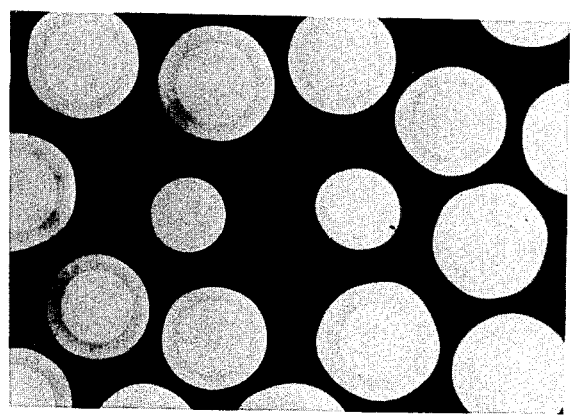
FIG. 2 is a radiograph of a sample of triso-coated particles after being subjected to $Cl_2$ at 1500° C. for 5 hours.

The radiograph of FIG. 2 illustrates several triso-coated particles after treatment with hot chlorine gas for five hours. It may be seen that two particles in the center of this figure have extensive porous carbon deposits illustrating that chlorine had passed through cracks in the outer LTI layers and reacted with the respective SiC layer of the particles.

On the basis of these and similar results, it has been determined that a chlorine treatment at 1500° C. for about two hours is preferred as substantial reaction takes place even with small cracks in the outer LTI layer. Thus, the resultant low-density carbon region(s) is clearly evident in radiographs.

In a normal performance of the present method, a representative sample of particles, having an outer LTI coating applied over the SiC layer, are placed in a boat within a reaction furnace where they are held at a temperature of 1500° C. Chlorine gas is passed continuously through the reaction vessel and out through appropriate traps and scrubbers. After the desired reaction time, e.g., two hours, the particles are cooled and removed for radiography. Typically, 6 KeV X-rays are used for the radiography. The number of particles showing a reaction between the chlorine and silicon carbide is observed and, on the basis of the sampling proportions, a value is ascribed to the average number of particles from a coating run that contains cracks in the outer LTI layer. This is known as the defective particle fraction of a coating batch.

The foregoing description of a preferred embodiment of the invention has been presented for purposes of illustration and description and is not intended to be exhaustive or to limit the invention to the precise form disclosed. It was chosen and described in order to best explain the principles of the invention and their practical application to thereby enable others skilled in the art to best utilize the invention in various embodiments and with various modifications as are suited to the particular use contemplated. It is intended that the scope of the invention be defined by the claims appended hereto.

What is claimed is:

1. A method for determining the existence of cracks penetrating the respective isotropic vapor-deposited carbon outer coatings covering respective silicon carbide coatings of respective triso-coated fuel particles, comprising the steps of subjecting said outer carbon coatings of said particles to a substantially pure chlorine gas atmosphere at a temperature of about 1500° C. for a selected time period in the range from 1 to 5 hours, cooling said particles, and finally radiographing said cooled particles to determine any change in density of the respective silicon carbide coatings of said particles as a result of any cracks in said outer coatings effecting a reaction between said chlorine gas and said silicon carbide coatings to form low density carbon and volatile silicon chloride, whereby any of said particles having cracks in the outer coating thereof can be readily determined from the resulting radiograph of said particles.

2. The method set forth in claim 1, wherein said selected time period is two hours.

* * * * *